Figure 1:
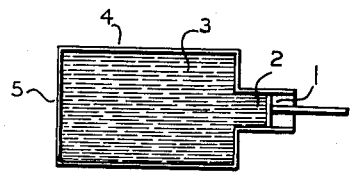

Oct. 12, 1954

E. W. SMITH 2,691,518

HYDRAULIC STIFFNESS SYSTEM

Filed Jan. 4, 1949

INVENTOR.
Edward W. Smith
BY
Ezekiel Wolf.
his Attorney

Patented Oct. 12, 1954

2,691,518

UNITED STATES PATENT OFFICE 2,691,518

HYDRAULIC STIFFNESS SYSTEM

Edward W. Smith, Melrose Highlands, Mass., assignor to Vibro Dynamic Engineering, Inc., Boston, Mass., a corporation of Massachusetts Application January 4, 1949, Serial No. 69,150

8 Claims. (Cl. 267—1)

The present invention relates to a hydraulic stiffness system and its application in various combinations for various purposes. Stiffness systems of the present application are systems which conform in general to the physical principles and rules of elasticity, such for instance as defined by the so called Young's Modulus. Under the definition of Young's Modulus, a substance is more highly elastic where greater pressures are required to produce relatively smaller elongations.

Materials which have high moduli of elasticity such as steel for instance are used extensively for springs of various characters. In order to obtain the proper amplitude of motion with the desired stress which the spring is to bear, special consideration must be given to the spring design, including such elements as cross-sectional area, shape, pitch, number of turns, and many other physical properties and characteristics of the spring and the metal. Where very great stiffnesses are required for the springs with comparatively large amplitudes of motion, it is sometimes difficult to obtain the desired results because metals may not withstand the compressional or torsional forces involved. In such cases, it is sometimes possible to overcome this difficulty by the use of a number of springs operating in a parallel system. This may, however, involve the use of more space than available or may present other difficulties which make such an arrangement unsatisfactory. Particularly in somewhat sustained vibratory systems, the spring element is subjected to such rapid and repeated compressions and extensions that even lower fiber stresses than normal must be used in order that the spring may have a satisfactory life.

The present invention provides a stiffness element which overcomes the difficulties set forth above. The invention is particularly applicable in such ranges of operation where comparatively higher stiffnesses of perhaps 40,000 lbs. per inch or more are required with a substantial amplitude of motion and comparatively rapid vibrations. This range often provides great difficulty in the proper design of stiffness elements. For greater stiffnesses and smaller amplitudes above the range mentioned and for large amplitudes with very small stiffness below the range mentioned comparatively less difficulties arise, as these types of springs may be designed well within the elastic limits of the materials which are used. However, in the range in which the present invention is concerned, great difficulty in design has always been experienced, and the materials used are compelled to operate in many cases so near the permissible operating limits that the life of the stiffness element or spring is usually far shorter than they should be.

In the present invention, a hydraulic stiffness unit is employed in which a substantially non-compressible medium is used such as oil or water, the stiffness being provided by the containing element holding the liquid. Such containing element is designed to expand and contract, providing through its varying stresses elastic forces, and through the hydraulic amplifiers the desired amplification of motion.

The present invention may be used in a balanced or in an unbalanced system, but other things being equal, a balanced system is in most cases preferable both from a construction point of view and from the point of view of efficiency and operation. The present invention is applicable both as a substitute for a spring or stiffness element and also for a storage energy system where the storage of energy may be controlled at will rather than as in the ordinary spring system where the interchanging from potential energy to kinetic or vice-versa automatically takes place as in the spring. In the latter modification, the stiffness element stores a desired amount of energy through the action of a small power source and this energy is delivered by the stiffness element under great power for a short interval. In this manner, the stiffness element will serve as substitute for a large power source acting over a small time interval.

Figure 2:
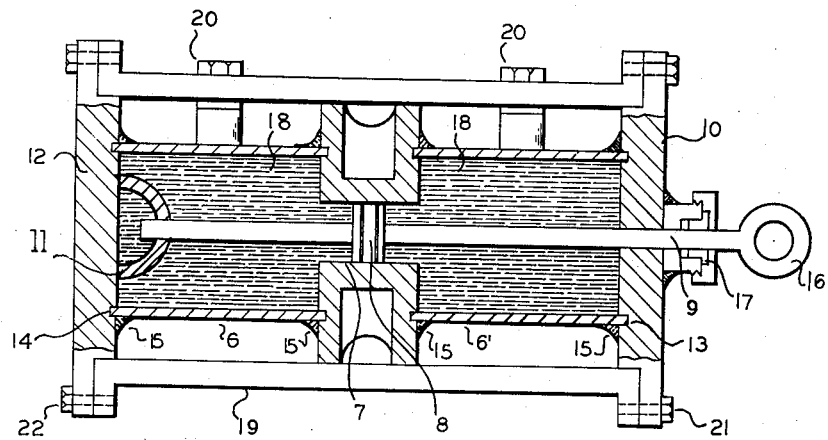
Figure 3:
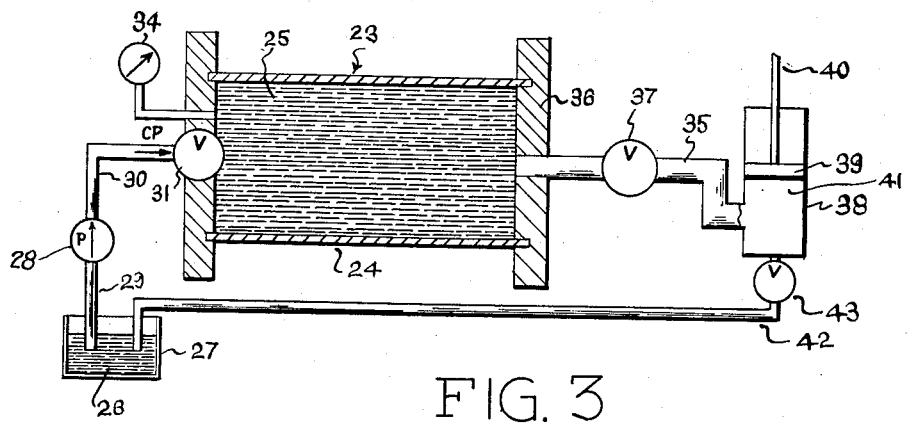

The invention will be more fully described in connection with the drawings annexed hereto and forming a part of the specification in which Figure 1 shows a diagram of a simple unbalanced system. Figure 2 shows a section through a balanced stiffness system, and Figure 3 shows diagrammatically a stiffness system in a power transformer to obtain from a primary source of continuous low power, a high power for short intervals.

In order to understand more thoroughly the nature of the operating of the stiffness system of the present invention and to avoid confusion with a pure hydraulic system, the formulas for the design and operation of the system of the present invention will be considered. Consider a half section of a cylinder filled with liquid. It can be shown that the pressure against such a section is equivalent to the pressure exerted against a vertical projection of the section. Since, therefore, the force within the pipe is sustained by the walls of the pipe, the tension per linear inch of the pipe will be $$T = \frac{DP}{2}$$

where $D$ = inside dia. of the pipe in inches
$P$ = pressure in lbs./sq. inch
$T$ = tension per linear inch in pounds Now suppose we consider that an allowable stress S will be permitted in the walls of the pipe. Under such conditions the thickness of the wall $t$ in inches will be $$t = \frac{T}{S} \quad \text{or} \quad t = \frac{DP}{2S}$$

If a hydraulic pressure is exerted on the inside of the pipe, it will bring about a distension of the walls which is a function of the pressure and the Young's Modulus of the material used.

The increase in the circumferential length obtained through the application of a pressure will be $d$ where $$d = \frac{Rl}{AE}$$

$R$ = pressure load in lbs.
$l$ = circumferential length in inches
$A$ = area in square inches
$E$ = Young's Modulus in lbs./sq. inch.

If we establish that the stress is not to exceed 15,000 lbs. per square inch, then with a Young's Modulus of 30,000,000 lbs. per square inch for steel we have $$d = \frac{1}{2000} \text{ inches}$$

Since in this case we are dealing with a circle, $l$ becomes $l = \pi D$ approximately.

The change in volume, $V'$, produced by the distension of the cylinder then is $$V' = \left[ \frac{\pi \left(D + \frac{D}{2000}\right)^2}{4} - \frac{\pi (D)^2}{4} \right] L$$

where $L$ = the length of the cylinder.

$$V' = \frac{\pi}{4}(.001 D^2) L$$

and $$D = \sqrt{\frac{4 V'}{\pi L (.001)}}$$

Substituting we have $$t = \frac{P}{2S} \sqrt{\frac{1000 V'(4)}{\pi L}}$$

If, as we assumed above, S is taken to be 15,000 lbs./sq. inch then $$t = \frac{P}{15,000} \sqrt{\frac{1000 V'}{\pi L}}$$

Considering the diagrammatical arrangement of Figure 1, assume that the total pressure applied to the piston 1 is $P'$, where P equals the pressure per square inch on the piston face, then $$P = \frac{P'}{\text{area}}$$

and the change in volume in the neck 2 will be $$V' = \frac{P'}{P}(a)$$

where $a$ = amplitude of motion in inches.

Substituting this value of V' in the last equation for thickness of the shell we have $$t = \frac{1}{15,000} \sqrt{\frac{1000 P' P a}{\pi L}} \quad (1)$$

$$D = \frac{2St}{P} \quad (2)$$

$$L = \frac{P' P a}{225 \pi (10)^3 t^2} \quad (3)$$

Equations 1, 2, and 3, give the three basic equations for determining the constants of the cylinder. Thus, knowing the total force to be exerted and the compression at which it is to be exerted, we have P' and $a$. The working pressure per square inch on the piston is a matter of design but once decided upon, it determines the area of the piston as indicated above. We then have a choice of using a predetermined length L of the cylinder 3 and adjusting the shell thickness 4 of the wall to a value determined by Equation 1, or choosing a predetermined thickness for the cylinder wall and determining its length from Equation 3. In either case the cylinder diameter will be governed by Equation 2.

From the above it may be seen that with the present invention the walls of a liquid filled cylindrical section of steel tubing are used to develop, by their distention, the required amount of stiffness. It should be born in mind that the equations given above are based on the use of steel cylinders, the thickness of the wall being small compared to the diameter of the cylinder. It should also be born in mind that the length L should be small compared to the wavelength of a compressional wave in the liquid used, at the desired frequency of operation, and that the end walls 5 of the cylinder are of sufficiently rigid construction that they do not contribute to any increase in volume during a pressure stroke. If the end wall 5 of the cylinder is designed to have any substantial extensibility, this work should be taken into account in computing the formula set forth above.

The physical form of the stiffness element will of course depend upon the application to which it is applied. It may be used as a resonant shake element in a paper wire machine where a large amplitude of motion is desired under comparatively high stresses. It may also be used in other industrial applications as for instance in screens for ore separation or in the vibration of metals in refining processes and in other industrial applications where it is desired to vibrate substances of great weight with large motional amplitudes.

The arrangement described in Figure 2 shows a stiffness unit which may be applicable to any of the devices described above. Two cylindrical tubes, 6 and 6' respectively, designed in accordance with the equations set forth above, are secured to a central element 2 which provides adjacent ends of each of the cylinders and a communicating sleeve section 7 in which a piston 8 can slide back and forth. The piston should have a close sliding fit in the wall of the neck 7 and may be provided for this purpose with usual piston rings commonly used in other constructions. The piston 8 is connected to a shaft 9 which passes through an end wall 10 of the cylinder 6' also in a sliding fit. The other end of the shaft 9 extending through or from the piston 8 is supported in a guide member or spider 11 which is mounted on the end wall 12 capping the cylinder 6. The cylinders 6 and 6' may be held in the end walls 10 and 12 respectively by any suitable means. As indicated in Figure 2, they may be set in grooves 13 and 14 respectively and also welded around such joints to the end walls as indicated by a weld 15 etc. As has been previously pointed out, the end walls 10 and 12 may be made thick in comparison with the cylindrical wall itself, so that it will not take part in the expansion and contraction or at least only to a small degree.

The shaft 9 projects through the wall 10 and may terminate in some holding element as for instance a ring or eye member 16. A suitable packing gland 17 may be used around the projecting end of the shaft 9 in order to keep the liquid 18 within the cylinders from leaking out.

In its operation, the piston 8 is preferably centered in the sleeve or collar 7 with the liquid 18 completely filling the cylinders on each side. The cylinders may be filled through a filling valve 20 in the cylindrical walls. If the shaft 9 is moved to the right, or relatively moved to the right with respect to the sleeve 7 then the liquid in the cylinder 6' will be put under pressure and the cylinder will expand and contract with resulant motion of the piston accordingly as set forth in the equations worked out above. When the piston is moved in the opposite direction either actually or relatively, then the cylindrical walls of the cylinder 6 will expand in a similar way. The stresses built up by such motion of the piston will provide the restoring force, not through the compression of the liquid which is substantially non-compressible, but through the stresses stored up in the metal cylinder itself. Roughly, the work done in forcing the piston back to a natural position from its extreme position one way or the other is the product of the total pressure on the piston surface times its length of travel, and this work or energy is equal to the amount of energy which is stored up by the expansion of the metallic walls of the cylinder itself. In the arrangement described in Figure 2, the ring element 16 will be coupled to the element of the larger amplitude while the cylinder and its supporting frame comprising the outer casing element 19 which extends between the end walls 10 and 12 and to which the end walls are bolted by bolts 21 and 22 is coupled to the element of smaller amplitude. In most cases, the larger mass of cylinders and its supporting structure remains stationary while the shaft 9 is the moving element.

In the arrangement indicated in Figure 3, the cylinder 23 corresponds to the cylinders 6 and 6' of Figure 2.

Here the wall 24 of the cylinder expands and contracts similarly as the cylinders 6 and 6', but instead of using a piston as in Figure 2, more liquid 25 is pumped into the cylinder from a liquid supply source 26 in the container 27. This liquid will increase the pressure within the cylinder and expand the cylindrical walls to put stress in the expandable wall 24. For the purpose of putting a volume over and above a normal static volume in the cylinder 23, a pump 28 which may be electrically operated is provided which need only be of a small size operating at low power. This pump will take the liquid through the line 29 and deliver it to the line 30 through a one-way valve 31 in the stiff end wall 32 of the cylinder 23. The cylinder may be provided with a gauge 34 to indicate tthe pressure within the cylinder and some common automatic means may be provided through a switch control mechanism for shutting off the pump 28 when the pressure within the cylinder reaches its maximum desired value.

In the arrangement of Figure 3, an outlet pipe 35 is provided in the end wall 36. A control valve 37 may be put in the outlet pipe 35 and this control valve may be intermittently operated or manually operated whichever may be desired. The outlet pipe 35 goes to the hydraulic motor 38 and delivers its power against the piston 39 for operating whatever is to be operated by the piston rod 40. The outlet pipe 35 may be large as compared to the inlet pipe 29 and the hydraulic motor can deliver in a short interval a large power compared to the power of the pump 28. The liquid in the piston cylinder 41 may be returned through the line 42 by suitable operation of the valve 43 at the desired instance of operation. In the system just described, the valves 37 and 43 may be manually operated or operated in conjunction with the mechanism to which the power is to be supplied. In this instance, the valves diagrammatically represented may be automatically controlled valves. The pump 28 may also be operated intermittently in accordance with whatever control is desired.

As an example of what can be accomplished with this system, let it be supposed that it is desired to exert an average force of 50,000 lbs. over a required piston stroke of 2 inches. This would mean energy requirements of 100,000 inch lbs. or 8,330 foot lbs. If this energy is expended over one-second periods, it is equivalent to 15 H. P. during the one-second period. If this operation is repeated once per minute, the motor operating the pump 28 need only supply ¼ H. P. continuously neglecting efficiency losses to provide this energy, whereas with the arrangement shown in Figure 1, a 15 H. P. motor would be needed.

Utilizing the pressurized tank filled with substantially incompressible fluid, the tank could have a wall 1 inch thick and be 75 inches inside diameter and 113 inches long, and be pumped to a pressure of 400 lbs. per square inch to store the energy from a ¼ H. P. motor running continuously, and yet at one-minute intervals supply energy equivalent to one-second output for a 15 H. P. motor. Saving in this type of installation is not only in the initial cost of the apparatus but is also in the running cost of the system, since a large powered source consumes energy in idle operation or in intermittently starting and stopping. In addition to this, the power supply lines would have to be large enough to carry the large load, whereas in the system according to the present invention, the power supply for a unit as described could operate from a regular ordinary line system.

Having now described my invention, I claim:

1. A hydraulic stiffness system of the type described comprising means providing an entirely enclosed liquid containing chamber having a rigid wall, and walls of highly elastic material of the characteristics of steel with a piston opening in said rigid wall, said walls of highly elastic material adapted to be expandable under a desired pressure and means in said opening having a motional amplitude for providing pressure at said piston opening when said chamber is filled with liquid for exerting said desired pressure in said chamber.

2. A hydraulic stiffness system of the type described comprising an entirely enclosed containing shell with walls of highly elastic material of the characteristics of steel adapted to expand and contract under varying pressure, a piston operating in one section of said shell to expand and contract the shell for providing large motional amplitude under high load, said enclosed shell having a liquid medium filling the same to the face of the piston when in operation.

3. A hydraulic stiffness system comprising an entirely enclosed containing shell having one end acting as one end of the stiffness system, a piston operating within the shell at the other end of the system, a liquid filling the shell against which the piston acts, said shell having highly elastic expandable walls of the characteristics of steel free of opening for the release of pressure whereby the amplitude of motion under comparatively high forces is large.

4. A hydraulic stiffness system comprising a pair of containing shells having communicating sleeve portions between the two shells, a piston having a piston rod attached thereto operating in said sleeve portion moving toward and away from said shells, a liquid filling said shells and sleeve, said shells having highly elastic expandable walls whereby a large force acting on said piston rod through the liquid against the shells will be supported through the stiffness system with a large motional amplitude of the piston.

5. A hydraulic stiffness system comprising a pair of containing shells having a communicating sleeve portion between the two shells, said shells and sleeve being aligned with one another, a piston positioned in said sleeve with a piston rod connected therewith for movement towards one or the other of said shells and operating in said sleeve through one of said shells, a liquid filling said shells and sleeve, said shell having highly elastic expandable walls whereby a large force acting on said piston rod against the shells through the liquid will be supported through the stiffness system with a large motional amplitude of the piston.

6. A hydraulic stiffness system comprising a pair of containing shells having a communicating sleeve portion between the two shells, said shells having highly elastic expandable side walls with relatively non-expandable heavy end walls, a piston operating in said sleeve with a piston rod connected therewith extending through one of said end walls, a liquid filling said shells and sleeves whereby a large force acting on said piston rod against the shells through the liquid will be supported through the stiffness system with a large motional amplitude of the piston.

7. A hydraulic stiffness system comprising a pair of containing shells having a communicating sleeve portion between the two shells, said shells having highly elastic expandable side walls with relatively non-expandable heavy end walls, an outer casing, means attaching said end walls to said outer casing, a piston operating in said sleeve with a piston rod connected therewith extending through one of said end walls, a liquid filling said shells and sleeves whereby a large force on said piston rod acting against the shells through the liquid will be supported through the stiffness system with a large motional amplitude of the piston.

8. A hydraulic stiffness system comprising a pair of aligned shells having stiff relatively non-expandable end walls, an outer casing, means supporting said end walls, said shells having side walls supported at their ends in the end walls, said side walls being elastic and expandable, a central communicating sleeve formed in the adjacent end walls of said shells, a piston operating in said sleeve with a piston rod connected therewith extending through one of the other end walls, a liquid filling both shells whereby a large force acting on said piston rod against the shell through the liquid will be supported through the stiffness system with a large motional amplitude of the piston.

References Cited in the file of this patent

UNITED STATES PATENTS

| Number | Name | Date |
|---|---|---|
| 1,142,825 | Lyons | June 15, 1915 |
| 1,857,750 | Wilbur | May 10, 1932 |
| 2,079,829 | Zoeller | May 11, 1937 |
| 2,185,023 | Crane | Dec. 26, 1939 |
| 2,290,479 | Mercier | July 21, 1942 |
| 2,318,437 | Vickers | May 4, 1943 |
| 2,341,556 | Joy | Feb. 15, 1944 |
| 2,374,737 | DeSoutter | May 1, 1945 |
| 2,452,176 | Bent | Oct. 26, 1946 |

FOREIGN PATENTS

| Number | Country | Date |
|---|---|---|
| 597,252 | Great Britain | Jan. 21, 1948 |
| 871,807 | France | Jan. 22, 1942 |